May 4, 1926.
R. E. WHITE
METHOD OF CONSTRUCTING BOILERS
Filed April 9, 1923
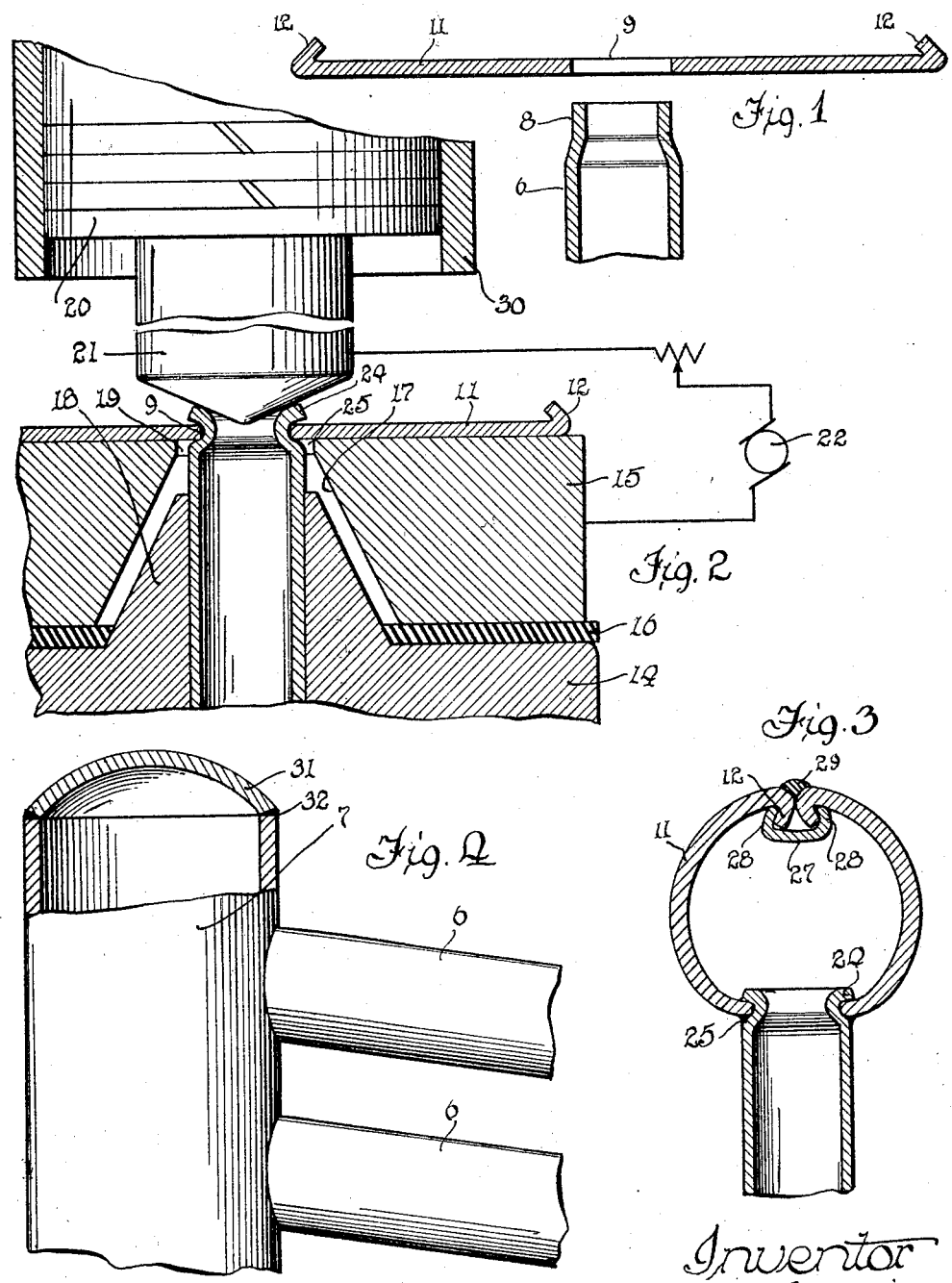
Inventor
Raymond E. White
By Brown Boettcher Dienner
Att'ys Patented May 4, 1926.

1,583,758

UNITED STATES PATENT OFFICE.

RAYMOND E. WHITE, OF CHICAGO, ILLINOIS, ASSIGNOR TO WINSLOW SAFETY HIGH-PRESSURE BOILER CO., OF CHICAGO, ILLINOIS, A CORPORATION OF ILLINOIS.

METHOD OF CONSTRUCTING BOILERS.

Application filed April 9, 1923. Serial No. 630,708.

*To all whom it may concern:*

Be it known that I, RAYMOND E. WHITE, a citizen of the United States, residing at Chicago, in the county of Cook and State of Illinois, have invented a certain new and useful Improvement in Methods of Constructing Boilers, of which the following is a full, clear, concise, and exact description, reference being had to the accompanying drawings, forming a part of this specification.

The present invention relates to an improved method of constructing boilers.

More specifically, it pertains to a method of constructing boiler sections of that type which are built up of a plurality of circulating tubes opening into an end header. The present method is particularly directed to the construction of these boiler sections by welding and expanding the plurality of circulating tubes in a plate, and then forming a header from this plate.

The practice of joining the circulating tubes to an open plate, or other non-tubular section of metal, has the important advantage of permitting free access to either side of the joint. Heretofore, this was only possible in headers or drums of large diameter, or, in the case of small headers, by cutting holes in the header diametrically opposite the joints and then plugging these holes after the completion of the joint. Free access to the inner and outer sides of the joint is of two-fold advantage. First, it allows the inner end of the circulating tube to be expanded or upset over the inner wall of the header, or rather, the header plate. This provides a positive mechanical lock in the nature of a flange or bead between the end of the tube and plate. Second, free access to each side of the joint enables a more perfect weld to be obtained, because it allows the two electrodes to be placed upon opposite sides of the weld, and to have any desired pressure exerted therebetween.

The ability to expand or up-set the end of the circulating tube in the header plate is of greater importance where the boiler must meet the specifications prescribed by certain engineering organizations, illustrated for example, by the A. S. M. E. which requires that a flange, bead or other mechanical lock be included at each weld between a circulating tube and header for safeguarding the weld against rupture. The practice of expanding or flanging the end of the circulating tube over on the inner side of the header plate has also a cooperative advantage with the weld inasmuch as it increases the area of welding fusion between the end of the circulating tube and the header plate.

Referring to the accompanying drawings illustrating the preferred manner and means of accomplishing my invention:—

Fig. 1 is a sectional view of the circulating tube and header plate separated; the circulating tube being illustrated in longitudinal section, and the header plate being illustrated in transverse section;

Fig. 2 illustrates the step of expanding or upsetting a flange from the inner end of the circulating tube over the inner wall of the header plate, and simultaneously perfecting a weld between the tube and plate;

Fig. 3 is a similar sectional view illustrating how the vertical edges of the header plate are brought together, are locked by a longitudinal locking bar, plate or strip, and are welded together; and Fig. 4 is a fragmentary elevational view of the completed boiler section with the upper end of the header broken away to illustrate one manner of closing the ends of the headers.

The boiler section which is the product of the present method is illustrated in Fig. 4, from which it will be observed that the section comprises a plurality of superposed circulating tubes 6 all joined at their ends to a common header or riser 7. The other ends of the circulating tubes 6 are similarly joined to a vertical header or riser 7, the tubes being preferably slightly inclined to stimulate the circulating action of the water in the sections. Boiler sections of this general description find extensive use in water-tube sectional boilers of the class exemplified by the Winslow or Babcock and Wilcox boilers.

Each circulating tube 6 is first swaged down or otherwise reduced at its end to provide a reduced neck 8 as seen in Fig. 1. This neck is adapted for insertion through an aperture 9 cut centrally in the header plate 11. This header member 11 is a wrought metal plate of the length of the required or completed header, and having individual apertures along its length for each of the several circulating tubes 6. Where the circulating tubes are directly superposed, the apertures 9 are in alignment extending down the center of the blank 11; but where the circulating tubes are staggered or off-set, these apertures are correspondingly offset from the median plane of the plate. The header member 11 may be curved, bent or of any other sectional outline, so long as the lateral edges thereof are separated sufficiently to allow free access to the inner ends 8 of each of the circulating tubes. In the preferred embodiment, however, I employ a substantially flat plate 11 having the lateral edges bent inwardly at an angle preferably at the same side of the plate to provide hook flanges 12.

The first step after inserting the reduced neck 8 of the circulating tube through the aperture 9 is to place the circulating tube in a clamping member 14 for firmly holding the tube. A copper electrode 15 is supported on this clamping member 14 and circumscribes the tube 6. An electrically insulating ring or plate 16 spaces the electrode 15 from the clamping member 14. The electrode 15 is provided with a tapering bore 17 which is spaced from a tapering clamping extension 18 which laterally supports the tube 6.

The header plate 11 rests on the flat upper surface of this electrode 15 so as to have electrical contact therewith over an extensive area. The electrode is spaced from the tube 6, as indicated at 19, but is disposed in close proximity thereto to confine the welding heat to the plate metal immediately surrounding the aperture 9.

A large tapered or taper ended electrode 21 is now inserted into the end of the tube 6, this latter electrode having mechanical support in any suitable manner whereby a considerable thrusting pressure can be exerted between the electrode 21 and the electrode 15. This can be accomplished by connecting the electrode 21 to a piston 20 in a high pressure cylinder 30 which high pressure cylinder is associated with the clamping member 14 in any suitable frame or supporting structure. The lower end of the electrode 21 is formed with an obtusely tapered nose 21′ having the proper pitch for upsetting and expanding the end of the tube over the inner wall of the header plate 11.

Both electrodes 15 and 21 are included in circuit with a high amperage current supply diagrammatically represented at 22. In perfecting the joint between the tube and header plate, this current is passed through the contacting surfaces of the tube and header plate at the same time that pressure is being applied to the end of the tube for upsetting the same. The current quickly softens the end of the tube so that the tapered nose 21′ of the upper electrode has no difficulty in expanding the end of the tube outwardly and downwardly into firm engagement with the inner wall of the header plate. Simultaneously this welding current is perfecting a weld or molecular union between the tube and plate, the welding current being first confined to the internal wall of the aperture 9 and the external neck portion of the tube contacting therewith. This results in a welding fusion between these opposing surfaces. After the end of the tube has been expanded downwardly to provide the inner locking flange 24, the current flow also takes a path through the contacting surfaces of this flange 24 and the header plate 11. Consequently, a weld is perfected between the under or outer surface of this flange and the plate. Simultaneously therewith, the header plate immediately surrounding the aperture 9 is compressed downwardly against the inner surface or shoulder 25 formed by the operation of inwardly swaging the end of the tube 6. This shoulder forms a mechanical abutment or lock for holding the tube and plate against displacement in one direction, and the flange 24 constitutes a positive lock for holding the tube and plate against displacement in the other direction. A certain degree of welding fusion will occur between this shoulder 25 and the under or outer side of the plate 11, whereby an external weld is also obtained at this point. After the tube and header plate are removed from the clamping mechanism, a welding fillet of additional metal may be flowed around any crevices at the shoulder 25 and around the lower edge of the inner flange 24, if desired.

The next step in the method is to draw the lateral edges of the header plate together, or otherwise complete the closure of the tubular header. In the preferred embodiment shown, this is accomplished by curving each side of the header plate towards the other side, over a curved die or in any other suitable manner. After the edges have been brought together, as shown in Fig. 3, a locking bar plate or strip 27 is inserted endwise down over the inwardly projecting hook flanges 12. This locking bar has inwardly deflected flanges 28 which match with the hook flanges 12 and securely bind the two edges of the header plate together. As an alternative expedient, the locking bar 27 may be of conventional channel section with parallel straight-sided flanges 28, which are slipped over the hook flanges 12 and are thereafter crimped inwardly into engagement with the inclined surfaces of these hook flanges by suitable crimping die mechanisms inserted longitudinally into the end of the header. The locking bar 27 constitutes an effective mechanical lock against separation of the edges of the header, and is a full compliance with the requirement for a mechanically locked connection prescribed by certain engineering societies, as hereinbefore mentioned.

The opposing edges of the header plate may be brought into direct contact, or may be left slightly separated, in the operation of locking these edges by the insertion of the locking bar 27. These opposing surfaces are now welded together, preferably by fusing a welding fillet of metal 29 in the longitudinal recess formed at the junction of these abutting edges. This welding fillet makes molecular cohesion with each side of the header plate and rigidly unites the two sides into an integral wall. If desired, the locking flanges 28 of the locking bar 27 may also be welded to the hook flanges 12 of the header plate by the insertion of suitable electrodes arranged to pass current through these opposing flanges.

The top of each header 7 may be closed by a convex cap 31, as shown in Fig. 4. This cap is welded around its edge to the end of the header, as shown at 32. Where a tapped connection is desired from the end of the header, the flanges 12 and locking bar 27 are terminated short of the end of the header and a heavy plug is welded in this end for receiving the tap.

I claim:

1. The method of constructing communicating tubes, which comprises joining one end of one tube in an apertured plate, and then forming the other tube from said plate.

2. The method of constructing communicating tubes, which comprises welding one end of one tube in an aperture of a plate and then forming the other tube from said plate.

3. The method of constructing communicating tubes which comprises providing an aperture in a plate, expanding one end of one tube in said aperture to mechanically lock said tube to said plate, and then connecting the edges of said plate to form the other tube.

4. The method of constructing communicating tubes, which comprises taking a plate and providing an aperture therein, inserting one end of one tube into said aperture and forming a joint between said tube and aperture, and then drawing the edges of said plate together for forming the other tube.

5. The method of constructing communicating tubes, which comprises taking a blank having spaced lateral edges, providing an aperture therein, inserting one end of one tube into said aperture, forming a rigid joint between said tube and said aperture, and connecting the lateral edges of said blank for completing the other tube.

6. The method of constructing communicating tubes which comprises taking a blank plate having spaced lateral edges, providing an aperture therein, inserting one end of one tube into said aperture, expanding the end of said tube to mechanically lock the latter in said aperture, and welding said tube in said aperture, drawing the edges of said blank plate together to form the second tube, and uniting said edges by a weld.

7. The method of constructing boiler sections which comprises providing an aperture in a plate, inserting one end of a tube into said aperture, upsetting the end of said tube therein, welding said tube in said aperture, and then drawing the edges of said plate together to form the second tube.

8. The method of constructing boiler sections which comprises taking a header blank providing an aperture therein, inserting one end of a circulating tube into said aperture, upsetting the end of said tube, welding said tube to said header blank, and drawing the edges of said header blank together and welding the same into an integral wall for completing a communicating header.

9. The method of constructing boiler sections which comprises taking a header blank, providing a series of apertures therein, inserting the ends of circulating tubes into each aperture, upsetting on the end of each tube to mechanically lock said tube in its respective aperture, welding each tube to said header blank, and welding the edges of said header blank together to complete an intercommunicating header.

10. The method of constructing boiler sections which comprises taking a header blank, forming locking flanges along its lateral edges, providing an aperture in said blank, reducing the end of the circulating tube, inserting said reduced end into said aperture to project beyond the other side of said header blank, upsetting the projecting end of said circulating tube, welding said tube to said header blank, drawing the edges of said header blank together, locking said edges by a locking bar engaging with said locking flanges, and welding the edges of said header blank together.

11. The method of constructing boiler sections which comprises taking a blank of substantially the length of the header, forming hooked flanges along the lateral edges thereof, providing an aperture in said blank, swaging down the end of the circulating tube, inserting this reduced end through said aperture, the shoulder at the swaged portion abutting the outer side of said header blank, expanding or upsetting the projecting end of the tube to form a flange rolled over on the inner side of said header blank, welding said tube to said header blank, drawing the edges of said blank together, mechanically locking the same by a locking bar having co-operating flanges engaging with said hook flanges, and welding the opposing edges of said header blank together.

12. The method of constructing communicating tubes, which comprises taking a blank having spaced lateral flanges, providing an aperture therein, inserting one end of one tube into said aperture, forming a rigid joint between said tube and said aperture, and connecting the lateral flanges of said blank for completing the other tube.

13. The method of constructing communicating tubes, which comprises taking a blank plate having spaced flanges, providing an aperture therein, inserting one end of one tube into said aperture, expanding the end of said tube to lock the latter in said aperture, and connecting the flanges of said blank for completing the closure of a second tube.

14. The method of constructing boiler sections which comprises taking a header blank, providing an aperture therein, providing locking shoulders adjacent the lateral edges of said blank, inserting one end of a tube into said aperture, expanding the end of said tube to connect the same to said header blank, drawing the edges of said header blank together, and connecting said edges and shoulders through said locking shoulders.

15. The method of constructing boiler sections which comprises taking a header blank, forming locking flanges along its lateral edges, providing an aperture in said blank, reducing the end of the circulating tube, inserting said reduced end into said aperture to project beyond the other side of said header blank, upsetting the projecting end of said circulating tube, welding said tube to said header blank, locking said flanges by a locking bar and welding the flanges and shoulders together.

16. The method of constructing boiler sections which comprises taking a header blank, forming locking flanges along its lateral edges, providing an aperture in said blank, reducing the end of the circulating tube, inserting said reduced end into said aperture to project beyond the other side of said header blank, upsetting the projecting end of said circulating tube, welding said tube to said header blank, drawing the flanges of said header blank together at the edges of the blank, locking said flanges by a locking bar engaging with said locking flanges, and welding the flanges and shoulders together.

17. The method of constructing boiler sections which comprises taking a header blank, forming locking flanges along its lateral edges, providing an aperture in said blank, reducing the end of the circulating tube, inserting said reduced end into said aperture to project beyond the other side of said header blank, upsetting the projecting end of said circulating tube, welding said tube to said header blank, locking said flanges by a locking bar and welding the flanges to each other and the flanges to the bar.

18. The method of constructing boiler sections which comprises taking a header blank, forming locking flanges along its lateral edges, providing an aperture in said blank, reducing the end of the circulating tube, inserting said reduced end into said aperture to project beyond the other side of said header blank, upsetting the projecting end of said circulating tube, welding said tube to said header blank, drawing the edges of said blank together, locking the flanges by a locking bar engaging with said locking flanges, so as to provide shoulders on the locking bar, and welding the flanges to each other and the flanges and shoulders together.

In witness whereof, I hereunto subscribe my name this 8th day of March, 1923.

RAYMOND E. WHITE.